United States Patent
Easty et al.

(10) Patent No.: US 6,490,587 B2
(45) Date of Patent: Dec. 3, 2002

(54) DYNAMIC DIGITAL ASSET MANAGEMENT

(76) Inventors: Allen Dwight Easty, 2023 Whippoorwill La., Carollton, TX (US) 75006; Byron David Wagner, 1040 N. Las Palmas, Bungalow A, Los Angeles, CA (US) 90038; Thomas Christian Wendt, 20024 Merridy St., Chatsworth, CA (US) 91311; Joel McConaughy, 246 Via Linda Vista, Redondo Beach, CA (US) 90277; Aaron Richard Baskin, 2220 Avenue of the Stars, #2001, Los Angeles, CA (US) 90067; Jonathan Trumbull Taplin, 17711 Revello Dr., Pacific Palisades, CA (US) 90272; Jeremiah Chechik, 882 Halderman Rd., Santa Monica, CA (US) 90402; Kevin Paul Headings, 26 4th St., Hermosa Beach, CA (US) 90254

( * ) Notice: Subject to any disclaimer, the term of this patent is extended or adjusted under 35 U.S.C. 154(b) by 0 days.

(21) Appl. No.: 09/733,173

(22) Filed: Dec. 8, 2000

(65) Prior Publication Data

US 2001/0047349 A1 Nov. 29, 2001

Related U.S. Application Data

(63) Continuation of application No. 09/054,751, filed on Apr. 3, 1998, now Pat. No. 6,189,008.

(51) Int. Cl.[7] ............................................... B06F 17/30
(52) U.S. Cl. ............................. 707/10; 707/1; 709/203; 709/223
(58) Field of Search ................... 707/10, 5, 1; 709/203, 709/223

(56) References Cited

U.S. PATENT DOCUMENTS

| | | | |
|---|---|---|---|
| 5,446,919 A | 8/1995 | Wilkins | 725/35 |
| 5,636,346 A | 6/1997 | Saxe | 705/1 |
| 5,710,884 A | 1/1998 | Dedrick | 709/217 |
| 5,710,887 A | 1/1998 | Chelliah et al. | 705/26 |
| 5,717,923 A | 2/1998 | Dedrick | 707/102 |
| 5,724,521 A | 3/1998 | Dedrick | 705/26 |
| 5,752,238 A | 5/1998 | Dedrick | 705/14 |
| 5,754,787 A | 5/1998 | Dedrick | 709/228 |
| 5,761,662 A * | 6/1998 | Dasan | 707/10 |
| 5,790,426 A | 8/1998 | Robinson | 702/179 |
| 5,835,087 A | 11/1998 | Herz et al. | 345/810 |
| 5,848,396 A | 12/1998 | Gerace | 705/10 |
| 5,855,008 A | 12/1998 | Goldhaber et al. | 705/14 |
| 5,864,871 A | 1/1999 | Kitain et al. | 707/104.1 |
| 5,881,131 A | 3/1999 | Farris et al. | 379/15.03 |
| 5,918,014 A | 6/1999 | Robinson | 709/219 |
| 5,933,811 A | 8/1999 | Angles et al. | 705/14 |
| 5,956,693 A | 9/1999 | Geerlings | 705/14 |
| 5,960,411 A * | 9/1999 | Hartman et al. | 705/26 |
| 6,052,554 A * | 4/2000 | Hendricks et al. | 455/5.1 |
| 6,236,975 B1 * | 5/2001 | Boe et al. | 705/7 |

* cited by examiner

Primary Examiner—Jean R. Homere
Assistant Examiner—Cheryl Lewis
(74) Attorney, Agent, or Firm—Martin & Ferraro, LLP

(57) ABSTRACT

Method and apparatus are utilized in a system for distributing digital contents from a central server to a plurality of endpoint servers for further distribution to end users for automatically managing the digital assets of the endpoint servers. Each endpoint server is connected to a plurality of users over a communications network and operable to deliver digital information content to users on demand. Using a master content stored at the central server, the digital content of each endpoint is periodically and automatically refreshed based on an aggregate profile that reflects the preferences of the end-user population served by the endpoint server. The aggregate profile is generated from information received from the end users, including information submitted by the users or automatically generated feedback information relating to the users' on-line activities.

65 Claims, 8 Drawing Sheets

DYNAMIC DIGITAL ASSET MANAGEMENT

This is a continuation of application Ser. No. 09/054,751, U,S. Pat. No. 6,189,008, filed Apr. 3, 1998, all of which is incorporated herein by reference.

FIELD OF THE INVENTION

The present invention relates to a system for distributing digital content from a central server to a plurality of endpoint servers for further distribution to end users. In particular, it relates to methods and apparatus for dynamically managing the digital assets of the endpoint servers based on aggregate profile information reflecting the preferences of the user population served by the endpoint server.

BACKGROUND

Broadband communication technologies have made it practical to deliver full motion video and other programming services to individual users on demand. The term "broadband" describes a service or system having a transmission speed of 1.5 Mbps (megabits per second) or greater. It also refers to the characteristics of any network technology that multiplexes multiple, independent network carriers onto a single cable, usually using frequency division multiplexing. The broadband platforms that are currently available, either on a commercial scale or on an experimental basis, include upgraded cable systems using cable modems, upgraded telephone delivery systems using the Asymmetric Digital Subscriber Line (ADSL) technology, and satellite delivery systems that allow interactive communication.

A cable modem is a modem device that connects a personal computer (PC) to a coaxial or fiber optic cable that transmits television signals. Communication via a cable modem system is interactive. In an upgraded cable system, the bandwidth of the cable is typically divided into a relatively wide bandwidth for downstream data transmission (i.e. from the network to the PCs in the households) and a relatively narrow bandwidth for upstream signaling and telephony. A cable modem incorporates a tuner that separates data signals, broadcast streams and telephony signals. A cable modem may also include network management software by which the cable company can monitor the operation of the modem, as well as encryption devices.

Digital subscriber lines (DSL) technologies have been developed to provide broadband data communication over the existing copper wire twisted-pair telephone networks. Among the DSL technologies, asymmetric digital subscriber lines (ADSL) technology takes advantage of the asymmetrical nature of interactive multimedia communication. ADSL transmits downstream data through a high-speed channel to a subscriber's computer and upstream signals through a lower-speed channel to the network, while simultaneously providing "Plain Old Telephone Service" (POTS). This makes it possible to transmit full motion video over a standard telephone line.

Direct broadcast satellite (DBS) systems that are currently used for broadcast video transmission may also be used to provide broadband interactive data transmission. In a DBS system, data is typically transmitted from a geosynchronous communications satellite directly to a dish antenna attached to a personal computer. To return data, the subscriber may dial up a local service such as an Internet service provider (ISP) over a standard analog modem. A network of low orbit geosynchronous communications satellites has also been proposed to create a digital network around the globe.

SUMMARY OF THE INVENTION

The developments in broadband telecommunications technologies not only make it possible, but also create a demand for providing interactive access to a broad range of entertainment and informational programming, including full-motion videos delivered to individual users on demand (video-on-demand). As used in this specification, "on-demand" describes delivery of digital information in real time in response to individual users'requests. The technological developments also create a demand for integrated digital content delivery systems and services that integrate various categories of information and entertainment services in a single subscription service. The presently described digital content distribution system is such an integrated information and entertainment content provider service. The categories of contents that may be delivered through this distribution system may include movies, videos, television programs, music, music videos, concerts, books, style, software, games, travel and the like. Advertisements may also be delivered by this system.

The digital content distribution system according to embodiments of the present invention comprises a central digital information source and a plurality of endpoint digital information sources connected to the central source via high-speed backbone communication channels. Each endpoint source is connected to a plurality of end users via a communications network. The endpoint sources are typically regionally located. Depending on the broadband distribution technologies employed, an endpoint information source may be a headend of a cable company, a central office of the telephone company (telco), an uplink facility of a satellite transmission company or the like. The respective communication network may be a cable network, a telephone network, a satellite transmission network or the like. Each end user may be a personal computer (PC), a network computer, a set-top box for a television set or other types of computers or devices connected to a communications network.

The communication between each endpoint server and its end users is bi-directional and interactive. Each end-user computer executes a client software program, which generates and transmits user requests to the endpoint server for delivery of information contents. The end user may also transmit to the endpoint server other information, such as rating of the information and services received or other feedback information. In addition, the client software may automatically transmit information related to the user's on-line activities to the endpoint server.

The central information source comprises a central server and a central database. Each endpoint source comprises an endpoint server and an endpoint database for storing information contents for delivery to end users. The central database stores all the digital information contents available on the content distribution system, which may be referred to as the master content. Each endpoint database typically stores only a subset of the master content. The central server automatically refreshes the content of each endpoint database, preferably on a regular basis, by selectively delivering new contents to the endpoint source and causing old contents stored therein to be selectively removed. (Depending on the context, the term "content" used in this specification may mean a piece of digital information, such as when referring to a content requested by a user; or the totality of digital contents stored in a database, such as when referring to the content of an endpoint database.)

For each endpoint source, the new contents to be delivered and the old contents to be removed are automatically determined by the central server base on information regarding the user population served by that endpoint server, referred to as an aggregate profile, as well as other information such as geographical location of the endpoint server. The aggregate profile, which may include information such as the frequency a particular content or type of content is requested by the users of the endpoint server, reflects the preferences of the user population served by the endpoint server. The aggregate profile is generated, either by the endpoint server or by the central server, based on information relating to the on-line activities of all users served by the endpoint server.

DETAILED DESCRIPTION OF THE EMBODIMENTS

Figure 1:
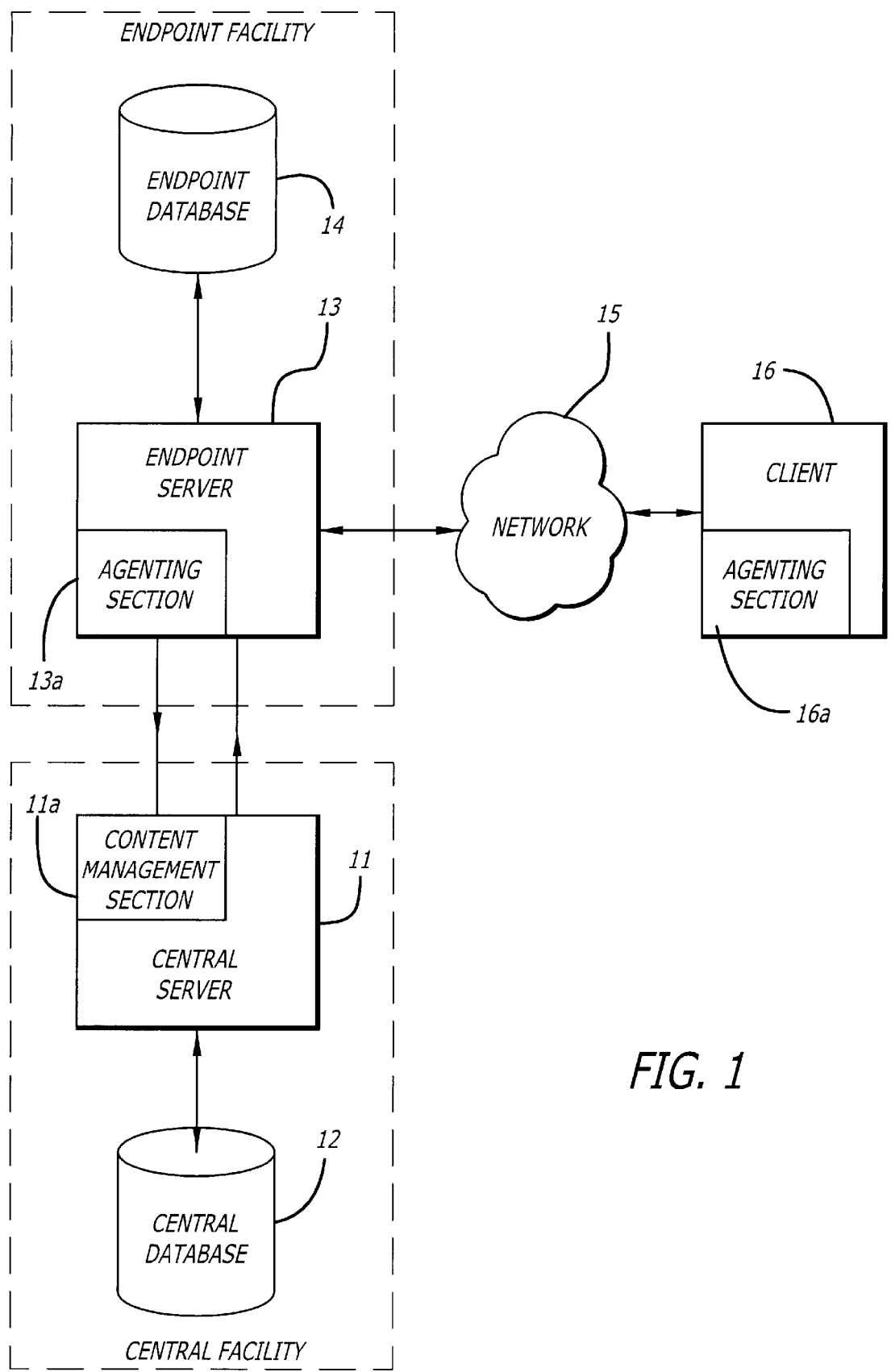
FIG. 1 is a schematic representation of a digital content distribution system according to the present invention.

FIG. 1 schematically illustrates a system according to an embodiment of the present invention for providing information contents to end users of the system. The system comprises a central facility having a central server 11 connected to a central database 12, and a plurality of endpoint servers 13 with each connected to an endpoint database 14 (only one endpoint server and one endpoint database are shown in FIG. 1). Each server is a single logical server, although it may comprise a plurality of physical servers. Each endpoint server 13 is connected to a communication network 15, to which end users or clients 16 of the information distribution service are also connected (only one user is shown. The plurality of endpoint servers and endpoint databases are typically located at different physical locations and serve end users in different geographical areas.

Each end user 16 may be a programmed computer such as a personal computer (PC), a network computer, or the like, running client software. The computer typically includes a processor; a memory; storage devices such as magnetic storage devices, re-writeable CDs or the like; display devices such as a video display, an audio display or the like; and input devices such as a mouse, a keyboard or the like. The computer may be connected to the network via a cable modem, a telephone modem, a satellite dish or the like. The end user may also be a set-top type of device that provides access to the network though a television set.

The client software residing on the user's PC serves as an interface between the human user and the endpoint server. Through the client, the user may submit requests for delivery of contents to the endpoint server, input information requested by the endpoint server, view or listen to the information received from the endpoint server, or store the received information for display at a later time. Preferably, the client provides a variety of interfacing capabilities, including video on demand, music download, agenting, electronic commerce, video conferencing and so on.

As presently contemplated, the communication network 15 is a broadband transmission system such as an upgraded cable system employing cable modems, an upgraded telephone delivery system using the Asymmetric Digital Subscriber Line (ADSL) technology, or a satellite delivery system that allows interactive communication. Other types of broad-band systems, including later-developed systems may also be used. Depending on the types of networks used, the endpoint server 13 may be located at a headend of a cable company, a central office of a telephone company, or a distribution facility of a satellite transmission company.

Each endpoint server 13 is connected to an endpoint database 14, which stores all digital information contents available for delivery to subscribers by that endpoint server. When a content delivery request is received from a user, the server 13 retrieves the requested content from the endpoint database 14 and delivers it to the requesting user via the communications network 15.

The endpoint server 13 also includes an agenting section 13a which cooperates with a client agenting section 16a of the client software 16 on a user's PC to act as a "personal assistant" for the user. The assistant may, for example, recommend contents to the user based on a user profile which reflects the user's habits and preferences, and allow a user to submit feedback information to the server, such as the user's rating of the delivered contents. The user profile is generated and continuously updated based on user information acquired by the agenting section 13a. User information may be obtained from several sources. First, information may be obtained from a user when he or she subscribes to the service, including the user's name, age, sex, locality and other demographic information. Second, user information may be acquired from the information transmitted by the client relating to the user's activities, such as the identity of the user, contents requested, contents purchased, date and time of each request, actual playing time of requested contents, stop signals, rating of the contents given by the user, other products or services purchased via on-line transaction and so on. Information relating to the user's activities may be referred to as affinity information.

Actual playing time refers to the portion of a delivered content that is actually played by the user. For example, the content distribution system may allow a delivered content to be stored in a storage device at the user's computer, and allow the user to play (including re-play) the content within a predefined time period such as 24 hours. In such a system, a content delivered to a user may not actually be played or played in its entirety by the user. Thus, the actual playing time for a delivered content is distinguished from the delivering of the content when affinity information is concerned. The ability to monitor actual playing time of a delivered content enhances the accuracy of the user profile and the effectiveness of agenting.

To calculate individual user profiles, each digital content on the distribution system (either at the central database 12 or at the endpoint databases 14) is assigned intrinsic parameters to describe the characteristics of the content. For example, an entertainment content may be characterized by its type of programming (movies, music, etc.), genre (rock, jazz, etc.), the artists involved, etc., and a book may be characterized by its topic (history, the Civil War, etc.) and author, etc. The agenting section 13a generates an affinity profile of a user by weighing and correlating the intrinsic parameters of the contents and the activity information obtained from the user. The affinity profile therefore reflects the individual user's preferences. The agenting section 13a may also compare the profiles of individual users against those of other users served by the same server to identify users with similar demographics or preferences.

The user profiles are stored at the endpoint server 13, and are continuously updated in real time. In other words, each time a request is received from a client, the agenting section 13a parses the new information, recalculates the correlations and updates the user profiles stored in the database. When making content selection recommendations for an individual user, the agenting section uses the user's profile to recommend contents from the endpoint database 14 that match the user's preferences. For example, the agenting section 13a may recommend a movie by a certain actor to a user who prefers that actor. The agenting section may also use the correlation between individual users to make content selection recommendations. For example, the agenting section may recommend a new CD that is referred by other users who have preferences similar to the user in question.

Although referred to as "a user," each computer connected to the network may be used by a plurality of human users, such as members of a household. Each human user may log onto the system using a unique user ID. The individual user profiles generated by the agenting section are associated with individual user IDs, rather than individual computers. This allows more specific and accurate profiles to be generated for each human user.

In addition to recommending information contents, the agenting section may also be used to produce customized advertising for each individual user.

Still referring to FIG. 1, the endpoint servers 13 are connected to the central server 11 by high-speed backbone communication channels such as a fiber optic network. The central database maintained by the central server stores all information contents available to the content delivery system, referred to as the master content. New information contents deposited into the system are stored in the central database 12, and subsequently distributed to the endpoint databases 14 through a content refreshing process. The endpoint databases 14 typically have smaller storage capacities than the central database 12, and only store selected subsets of the master content. The central server 11 periodically refreshes the contents stored at the endpoint databases 14 by automatically delivering selected contents to, and/or removing selected contents from, the endpoint databases. To make the most efficient use of the endpoint storage capacity, a different subset of contents is stored at each endpoint database 14, depending upon an aggregate profile which reflects the preferences of the user population served by that endpoint server 13.

The central server 11 comprises a content management section 11a which cooperates with the agenting section 13a of the endpoint servers 13 to refresh the information contents stored in the endpoint databases 14. At each endpoint, the agenting section 13a of the endpoint server 13 generates aggregate affinity information for the contents currently stored in the endpoint database 14. Such information may include, for example, the number of times each content is requested within a predetermined time period, accumulated actual playing time, average rating, revenue generated and the like. The endpoint server 13 also generates aggregate demographic information for the server, such as the age distribution of the user population it serves. The aggregate affinity and demographic information and the intrinsic parameters of the contents are then weighed and correlated to generate an aggregate profile. Such an aggregate profile reflects the characteristics and preferences of the user population served by the endpoint server.

Figure 2:
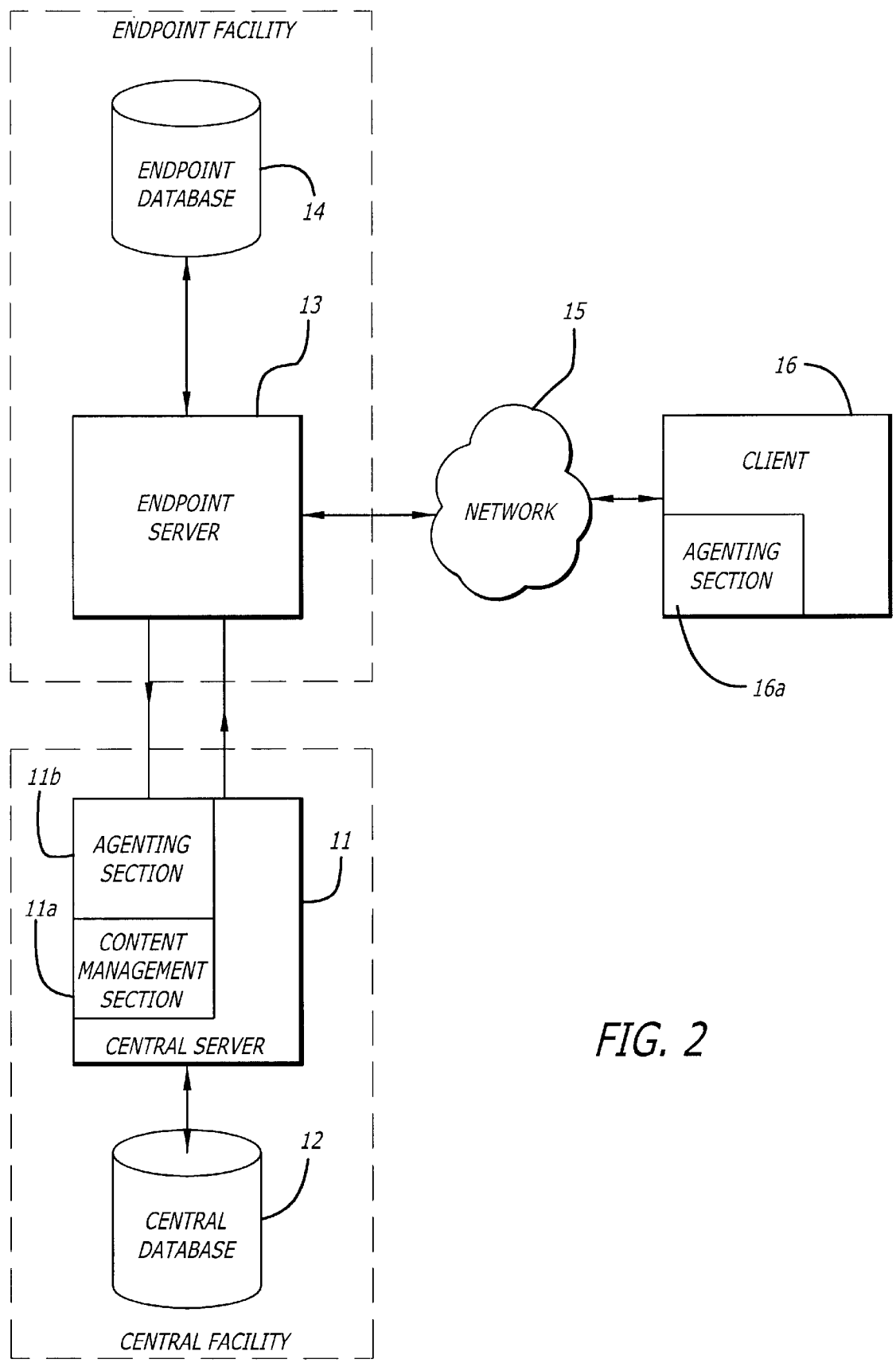
FIG. 2 is a schematic representation of another digital content distribution system according to the present invention.

FIG. 2 schematically illustrates an alternative architecture for a digital content distribution system according to a second embodiment of the present invention. The system of FIG. 2 is generally similar to the system shown in FIG. 1 (with the same components designated by the same reference numerals), except that the agenting function now resides in an agenting section 11b on the central server 11, rather than on each endpoint server 13 as shown in FIG. 1. In the system of FIG. 2, the user requests and other user information received by each endpoint server 13 from its clients 16 are transmitted to the central server 11 for processing, rather than processed at the endpoint server 13. The agenting section 11b on the central server 11 performs the agenting functions performed by the agenting section 13a in the system of FIG. 1, including capturing the user information, generating affinity profiles for individual users, cross-correlating profiles of different users, and recommending contents to individual users based on the user profile and the available contents at the corresponding endpoint database 14.

The agenting section 11b in the central server 11 also generates aggregate information for each endpoint server 13, including aggregate affinity and demographic information, and weighs and. correlates the aggregate information to generate an aggregate profile for each endpoint server. In the system of FIG. 2, the user profiles and other user information, as well as the aggregate information and aggregate profiles, are preferably stored at the central server 11. In other words, the aggregate profile for each endpoint server is maintained by the central server 11 for each endpoint server 13.

Compared with the system of FIG. 1 in which the agenting sections reside on individual endpoint servers, the alternative architecture shown in FIG. 2 generally reduces software complexity and simplifies maintenance, but tends to increase network traffic and the computational load at the central server. Thus, dependent on the relative costs and capacities of the various resources, one of the systems may be more preferable. The system of FIG. 2 has additional advantages, such as the ability to cross-correlate user profile information among users served by different endpoint servers, since all user information is stored at the central server.

Figure 3A:
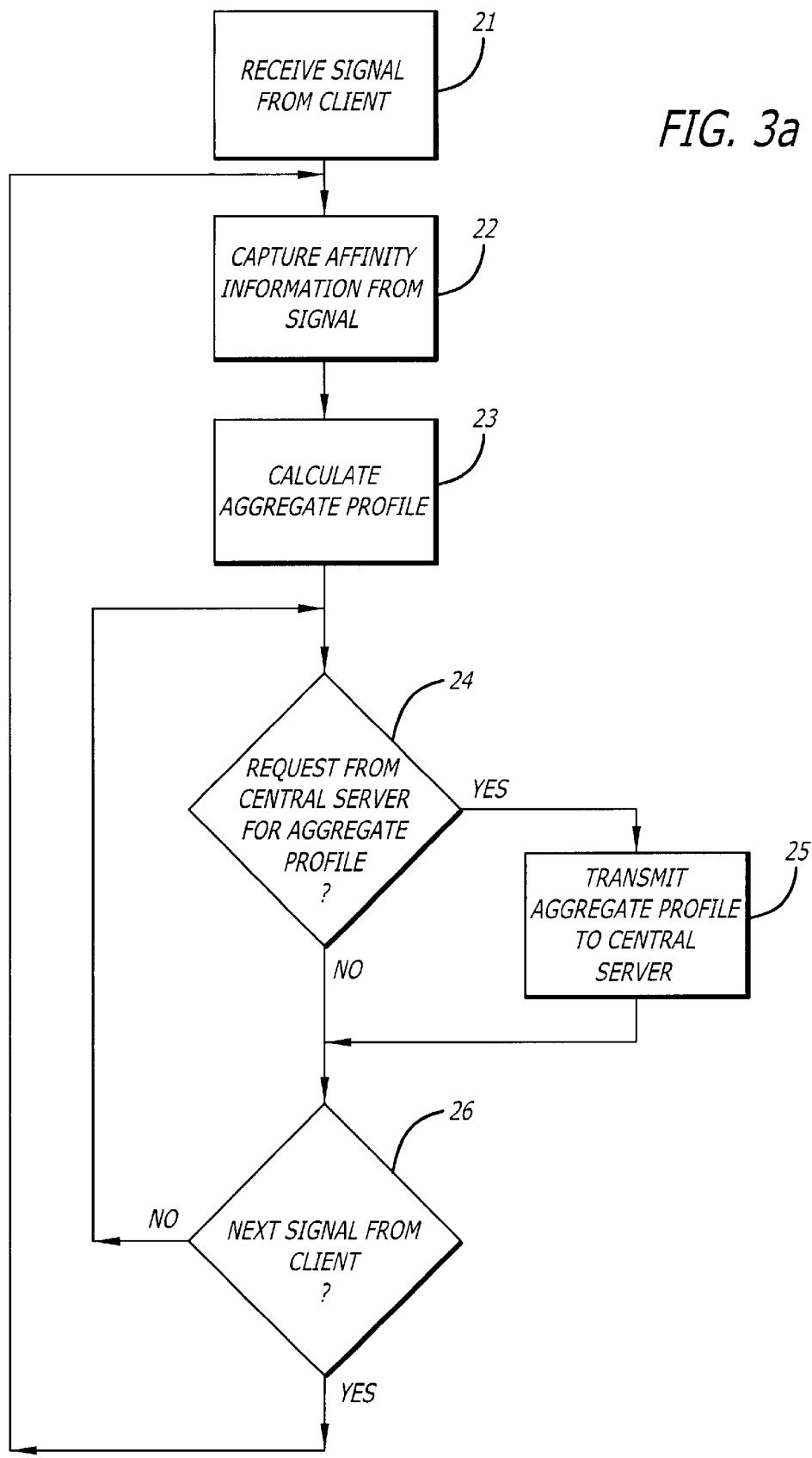
FIGS. 3a–3c are flow diagrams illustrating methods of calculating the aggregate profile of an endpoint server employed by the system of FIG. 1.
Figure 3B:
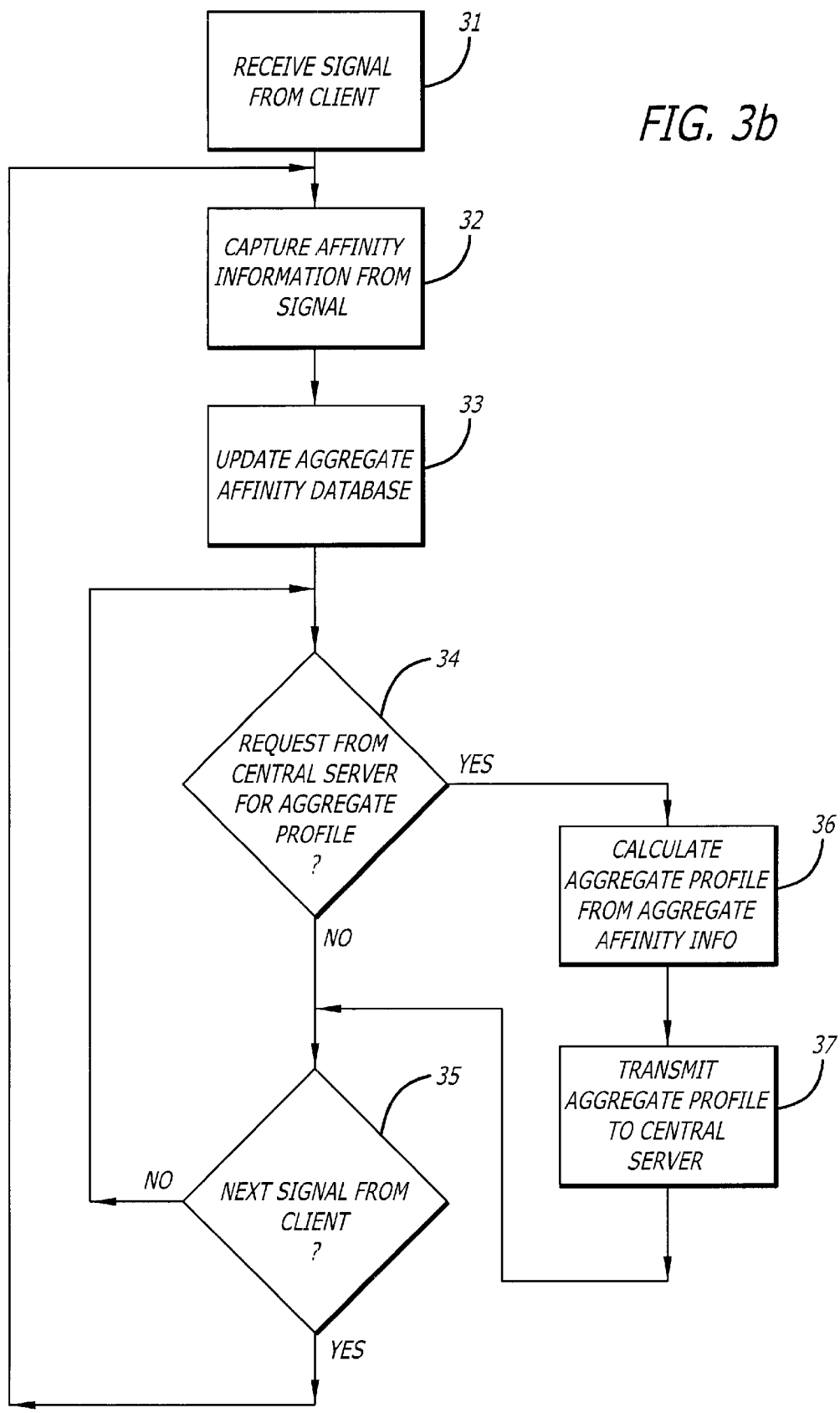
Figure 3C:
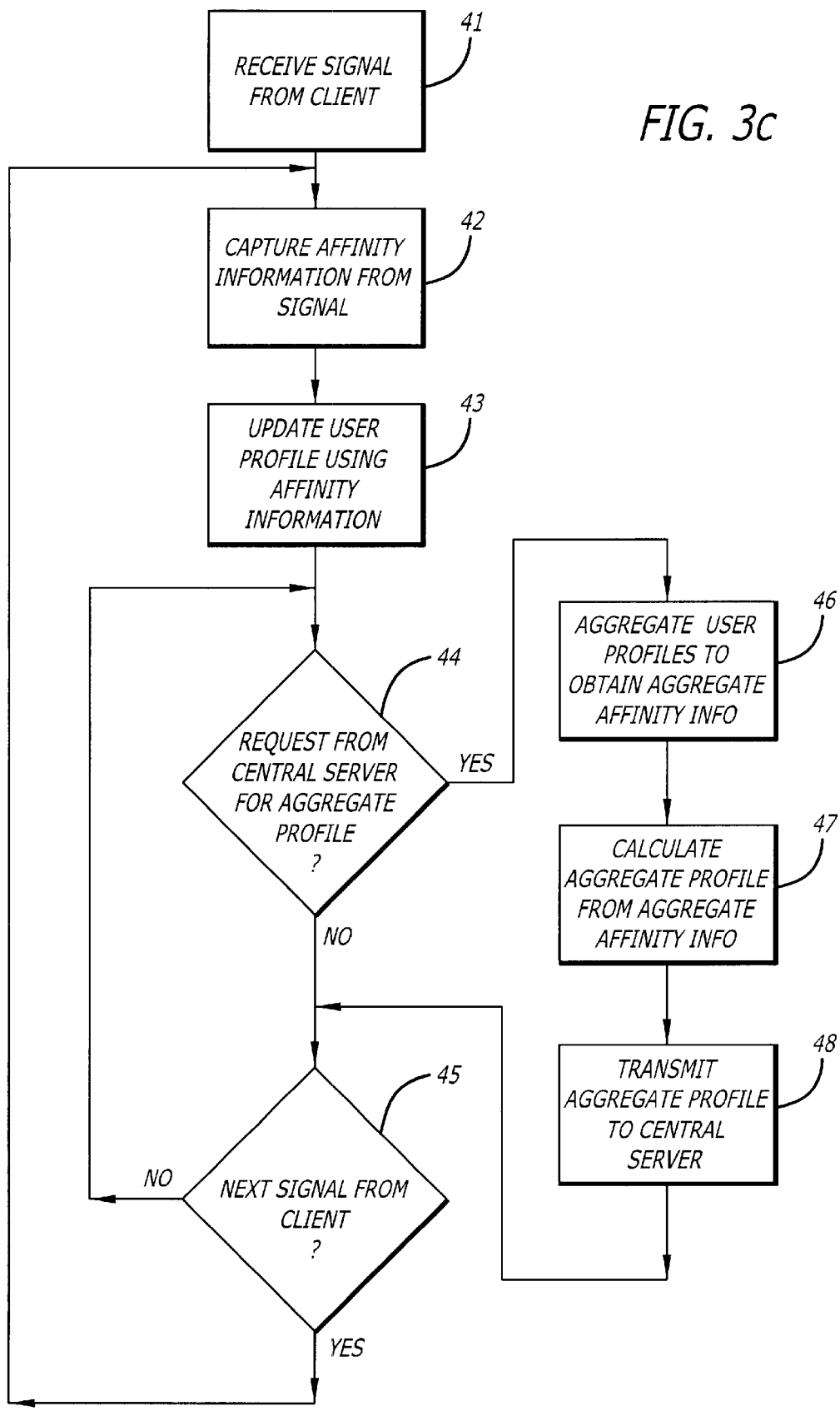

The raw data used to generate the aggregate profile is typically the same data from which individual user profiles are generated, such as delivery requests or feedback information received from the clients 16 relating to each user's on-line activities. From such raw data, the aggregate profile may be generated in several ways. The methods used for a system according to FIG. 1, where the agenting section resides in the endpoint servers, are described first with reference to FIGS. 3a–3c.

One method (FIG. 3a) is to generate and continuously update the aggregate profile in real time. This involves re-calculating the aggregate profile each time a request or feedback is received from a client. When a signal is received from a client (step 21), the endpoint server 13 captures affinity information embedded in the signal, such as the content requested (step 22), and calculates the aggregate profile (step 23). The aggregate profile is maintained at the endpoint server 13, and transmitted to the central server 11 upon a request from the latter (steps 24 and 25). The server then waits for the next signal from a client to be received (step 26).

In an alternative method (FIG. 3b), from the received user signal (step 31), the affinity information is captured (step 32) and partially processed to update an aggregate affinity database in real time (step 33). The aggregate affinity database is maintained at the endpoint and may contain, for example, the total number of times each content is requested, which is updated each time a user request for a content is received. Based on the aggregate affinity database, the aggregate profile may then be calculated when desired, such as when required by the central server (steps 34 and 36), and transmitted to the central server (step 37). The server then waits for the next signal from a client to be received (step 35).

Yet another alternative method (FIG. 3c) is to calculate the aggregate profile using individual user profiles. Such user profiles are already maintained and updated in real time by the agenting section at the endpoint server, and typically store all relevant affinity information captured from signals generated by the clients. Thus, no separate aggregate affinity database is maintained. A signal is received from a client (step 41), affinity information is captured therefrom (step 42), and user profiles are updated in real time using the affinity information (step 43). When required by the central server (step 44), the information contained in all user profiles is aggregated to generate aggregate affinity information (step 46), from which the aggregate profile is calculated (step 47) and transmitted to the central server (step 48). The server then waits for the next signal from a client to be received (step 45).

Figure 4A:
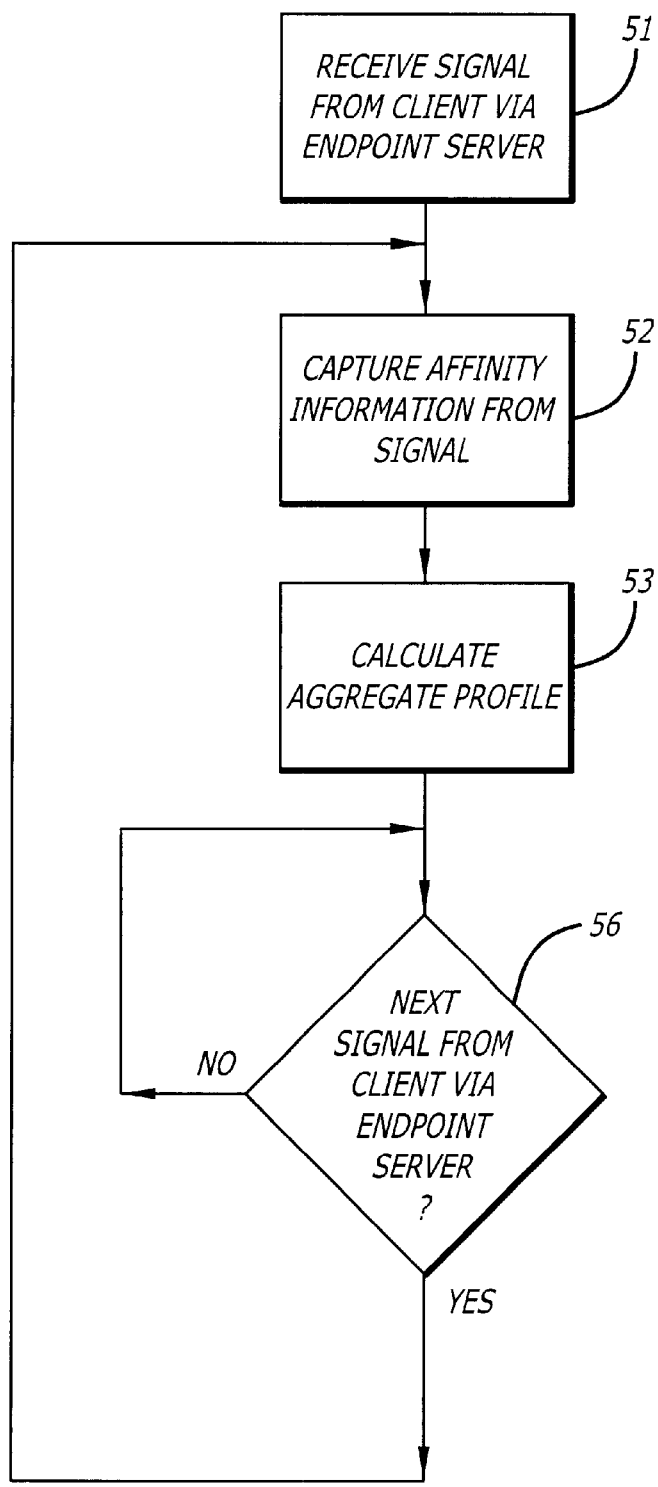
FIGS. 4a–4c are flow diagrams illustrating methods of calculating the aggregate profile of an endpoint server employed by the system of FIG. 2.
Figure 4B:
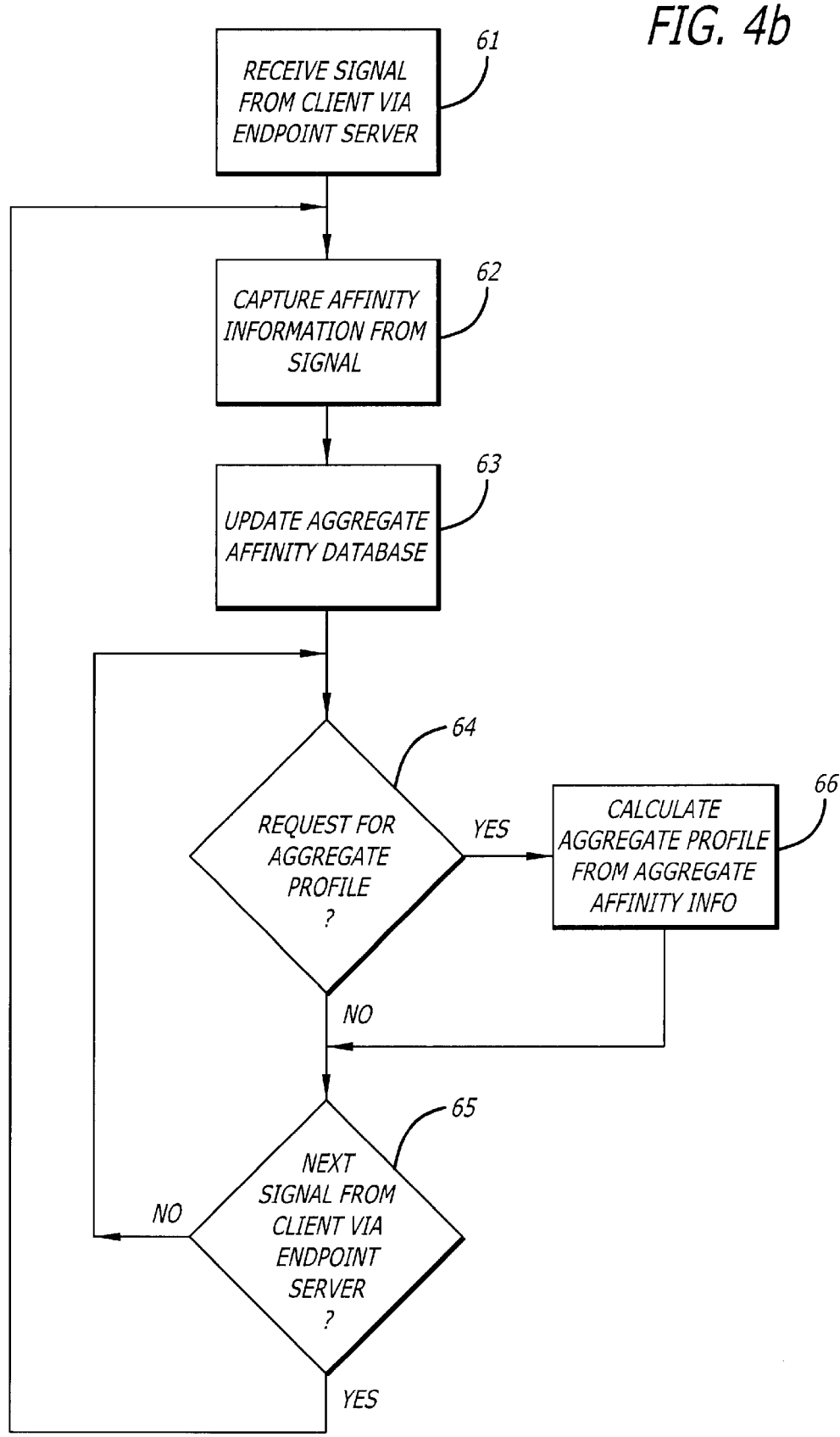
Figure 4C:
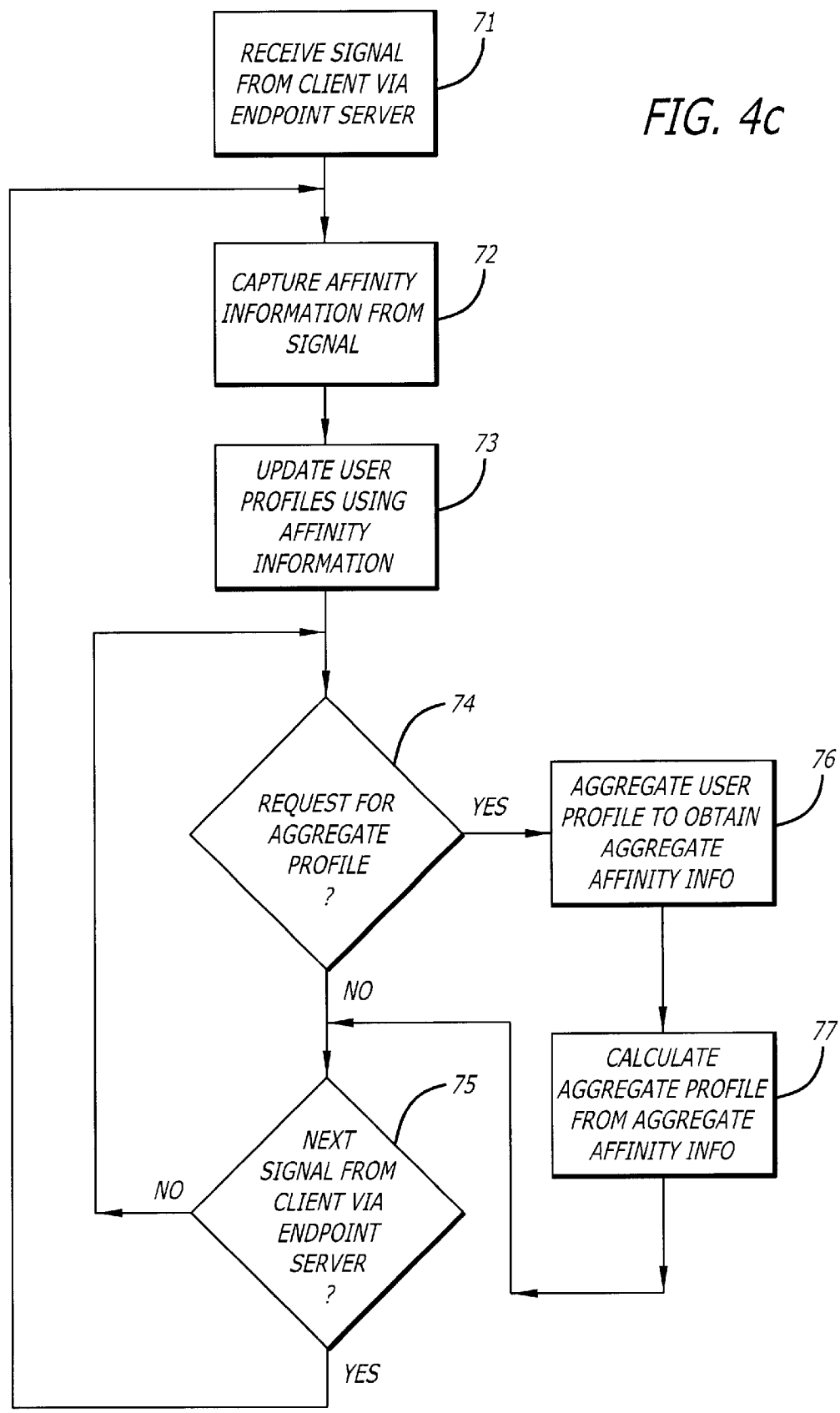

The methods for generating aggregate profiles illustrated in FIGS. 4a–4c may be employed in the system shown in FIG. 2. These methods are similar to the methods illustrated in FIGS. 3a–3c, respectively, except that the steps are performed by the agenting or the content management section of the central server, rather than by the endpoint server. The processed data, such as aggregate profile, aggregate affinity information and user profiles are maintained at the central server. Thus, the transmission steps in FIGS. 3a–3c(steps 25, 37 and 48) are not necessary for the methods of FIGS. 4a–4c. The requests for aggregate profiles in steps 64 and 74 may be generated by the content management section when refreshing the contents of endpoint databases.

When refreshing the contents for an endpoint database 14, the content management section 11a of the central server requests the aggregate profile for the corresponding endpoint server 13. Depending upon the system architecture, this request is sent either to the agenting section 13a of the endpoint server 13 (for the system shown in FIG. 1 ) or to the agenting section 11b of the central server 11 (for the system shown in FIG. 2). Upon obtaining the aggregate profile, the content management section 11a of the central server 11 correlates the aggregate profile of the endpoint server 13 with the intrinsic parameters of all contents available in the central database 12. Other information may also be used in the correlation calculation, such as the locality of the endpoint server 13. In addition, the central server 11 may also correlate the aggregate profiles between different endpoint servers.

Based on these analyses, each content stored in the central database 12 is assigned a priority, and a subset of contents is selected from the master content to refresh the content of the endpoint database 14. Selections may be made according to individual priorities only and regardless of the type of programming. Alternatively, the contents may be categorized according to the type of programming or other criteria, and each category may be allocated a predetermined percentage of the total contents to be stored at the endpoint database 14. The contents for each category are then selected according to the priority of each content until the percentage allocated to that category is reached.

The selected subset of the master content is then used to refresh the content of the endpoint database 14. Contents that are selected and are not currently stored in the endpoint database 14 are distributed to the endpoint server 13 via the backbone communication channel. Contents that are currently stored in the endpoint database 14 but are not selected are removed by the endpoint server 13 in response to commands from the central server 11.

The digital content distribution system described herein also allows the endpoint servers 13 to include local content and advertising into the endpoint database 14.

Alternative methods are described for processing raw data received from the clients 16 to generate aggregate profiles for the endpoint servers 13. In these methods, the data processing steps are distributed in different ways between the central servers 11 and the endpoint servers 13. Other alternative ways of distributing the data processing tasks may also be employed, and appropriate data storage and transmission steps may be provided consistent with the distribution of data processing tasks. For example, in the method described in FIG. 3b, the step of calculating the aggregate profile from the aggregate affinity information (step 36) may be performed by the central server 11, in which case the endpoint server 13 will simply transmit the aggregate affinity information generated in step 33 to the central server 11 upon a request from the latter. Similarly, in the method of FIG. 3c, step 47, or both steps 46 and 47, may be performed by the central server 11.

Although only two levels of servers, i.e. the central server 11 and the endpoint servers 13 are described in the embodiments, intermediate servers between the central server 11 and the endpoint servers 13 may also be used as hubs.

The methods described in the present specification are preferably implemented in computer software, but may also be implemented in hardware circuits.

While embodiments and applications of the present invention have been shown and described, it should be apparent to those skilled in the art that many more modifications are possible without departing from the inventive concepts herein. The presently disclosed embodiments are therefore to be considered in all respects as illustrative and not restrictive, the scope of the invention being indicated by the appended claims, rather than the foregoing description. The accompanying claims are intended to cover such and other modifications as would fall within the true scope and spirit of the present invention. All changes which come within the meaning and range of equivalency of the claims are therefore intended to be embraced therein.

What is claimed is:

1. A method for recommending additional content to a user of a system for delivering the content over a network, the method comprising the steps of:

acquiring information associated with the usage of the content by the user without manual input by the user;

generating a profile of the user based on the information acquired from said acquiring step; and recommending the additional content to the user based on the profile generated.

2. The method of claim 1, wherein said acquiring step includes acquiring at least one of demographic information, an amount of time the content is used by the user, and preferences of the user.

3. The method of claim 1, wherein said recommending step includes the substep of correlating characteristics of the content with the profile.

4. The method of claim 3, wherein the characteristics include at least one of a type of programming, a genre, and a performer.

5. The method of claim 1, wherein the content includes at least one of a movie, book, television program, music, audio, video, software, and game.

6. The method of claim 1, wherein the content is adapted to be downloaded to the user.

7. The method of claim 6, wherein the content includes music accessible through a music subscription service.

8. The method of claim 6, wherein the content includes video accessible through a video subscription service.

9. The method of claim 6, wherein the content is accessible over a satellite distribution system.

10. The method of claim 6, wherein the content is accessible over a cable subscription service.

11. The method of claim 1, wherein the content is streamed to the user over the network.

12. The method of claim 11, wherein the content includes music accessible through a music subscription service.

13. The method of claim 11, wherein the content includes video accessible through a video subscription service.

14. The method of claim 11, wherein the content is accessible over a satellite distribution system.

15. The method of claim 11, wherein the content is accessible over a cable subscription service.

16. The method of claim 1, wherein the content is video content, further comprising the step of delivering the video content to the user.

17. A method for recommending additional content to a plurality of users of a system for delivering the content over a network, the method comprising the steps of:

acquiring information associated with the usage of the content by at least two of the users;

correlating the information acquired from a first one of the users with the information acquired from at least a second one of the users; and recommending the additional content to the first one of the users based on said correlating step.

18. The method of claim 17, wherein said acquiring step includes acquiring at least one of demographic information, an amount of time the content is used by the user, and preferences of the user.

19. The method of claim 17, wherein said correlating step includes the sub-step of correlating characteristics of the content with the profile.

20. The method of claim 19, wherein the characteristics include at least one of a type of programming, a genre, and a performer.

21. The method of claim 17, wherein the content is adapted to be downloaded to the user.

22. The method of claim 21, wherein the content includes music accessible through a music subscription service.

23. The method of claim 21, wherein the content includes video accessible through a video subscription service.

24. The method of claim 21, wherein the content is accessible over a satellite distribution system.

25. The method of claim 21, wherein the content is accessible over a cable subscription service.

26. The method of claim 17, wherein the content is streamed to the user over the network.

27. The method of claim 26, wherein the content includes music accessible through a music subscription service.

28. The method of claim 26, wherein the content includes video accessible through a video subscription service.

29. The method of claim 26, wherein the content is accessible over a satellite distribution system.

30. The method of claim 26, wherein the content is accessible over a cable subscription service.

31. A system for recommending content to a user of a system for delivering content over a network, comprising:

a central server connected to a network for delivering the content to a plurality of users;

at least one database associated with said central server for storing the content; and an agenting section associated with said central server for acquiring information associated with the usage of the content by the user without manual input by the user and recommending additional content to the user based on the information acquired.

32. The system of claim 31, wherein said agenting section is adapted to generate a profile of the user based on the information acquired.

33. The system of claim 32, wherein said agenting section is adapted to use the profile to recommend the additional content to the user.

34. The system of claim 31, wherein said agenting section is adapted to obtain information including at least one of demographic information, an amount of time the user views the content, and preferences of the user.

35. The system of claim 31, wherein said agenting section is adapted to correlate characteristics of the content with the information for generating a profile of the user.

36. The system of claim 35, wherein the characteristics include at least one of a type of programming, a genre, and a performer.

37. The system of claim 31, wherein the content includes at least one of a movie, book, television program, music, audio, video, software, and game.

38. The system of claim 31, wherein the content is adapted to be downloaded to the user.

39. The system of claim 38, wherein the content includes music accessible through a music subscription service.

40. The system of claim 38, wherein the content includes video accessible through a video subscription service.

41. The system of claim 38, wherein the content is accessible over a satellite distribution system.

42. The system of claim 38, wherein the content is accessible over a cable subscription service.

43. The system of claim 31, wherein the content is streamed to the user over the network.

44. The system of claim 43, wherein the content includes music accessible through a music subscription service.

45. The system of claim 43, wherein the content includes video accessible through a video subscription service.

46. The system of claim 43, wherein the content is accessible over a satellite distribution system.

47. The system of claim 43, wherein the content is accessible over a cable subscription service.

48. The method of claim 31, wherein the content is video content, further comprising the step of delivering the video content to the user.

49. A system for recommending content to a user of a system for delivering content over a network, comprising:

a central server connected to a network for delivering the content to a plurality of users;

at least one database associated with said central server for storing the content; and an agenting section associated with said central server, said agenting section being adapted to acquire information associated with the usage of the content by the user, said agenting section being adapted to acquire information associated with the usage of the content by additional users, said agenting section being adapted to correlate the information acquired from the user with the information acquired from the additional users, said agenting section being adapted to recommend the additional content to the user based on the correlation performed.

50. The system of claim 49, wherein said agenting section is adapted to generate an individual profile of each user based on the information acquired.

51. The system of claim 50, wherein said agenting section is adapted to use the profile to recommend the additional content to the user.

52. The system of claim 49, wherein said agenting section is adapted to obtain information including at least one of demographic information, an amount of time the user views the content, and preferences of the user.

53. The system of claim 49, wherein said agenting section is adapted to correlate characteristics of the content with the information for generating a profile of the user.

54. The system of claim 53, wherein the characteristics include at least one of a type of programming, a genre, and a performer.

55. The system of claim 49, wherein the content includes at least one of a movie, book, television program, music, video, software, and game.

56. The system of claim 49, wherein the content is adapted to be downloaded to the user.

57. The system of claim 56, wherein the content includes music accessible through a music subscription service.

58. The system of claim 56, wherein the content includes video accessible through a video subscription service.

59. The system of claim 56, wherein the content is accessible over a satellite distribution system.

60. The system of claim 56, wherein the content is accessible over a cable subscription service.

61. The system of claim 49, wherein the content is streamed to the user over the network.

62. The system of claim 61, wherein the content includes music accessible through a music subscription service.

63. The system of claim 61, wherein the content includes video accessible through a video subscription service.

64. The system of claim 61, wherein the content is accessible over a satellite distribution system.

65. The system of claim 61, wherein the content is accessible over a cable subscription service.

* * * * *